(12) United States Patent
Hashiguchi et al.

(10) Patent No.: US 11,606,033 B2
(45) Date of Patent: Mar. 14, 2023

(54) SWITCHING POWER SUPPLY DEVICE

(71) Applicant: ROHM Co., LTD., Kyoto (JP)

(72) Inventors: Shingo Hashiguchi, Kyoto (JP); Isao Takobe, Kyoto (JP); Keita Itohara, Kyoto (JP); Akihiro Kawano, Kyoto (JP); Hironori Sumitomo, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 3 days.

(21) Appl. No.: 17/330,775

(22) Filed: May 26, 2021

(65) Prior Publication Data

US 2021/0376727 A1 Dec. 2, 2021

(30) Foreign Application Priority Data

May 29, 2020 (JP) .............................. JP2020-094287

(51) Int. Cl.
*H02M 3/158* (2006.01)
(52) U.S. Cl.
CPC ....... *H02M 3/1584* (2013.01); *H02M 3/1582* (2013.01)
(58) Field of Classification Search
CPC .................................................. H02M 3/1584
See application file for complete search history.

(56) References Cited

U.S. PATENT DOCUMENTS

| 9,966,842 | B1* | 5/2018 | Jiang | ........................ G05F 1/565 |
| 2012/0126777 | A1* | 5/2012 | Motegi | ............... H02M 3/1582 |
| | | | | 323/311 |
| 2013/0336012 | A1* | 12/2013 | Broussev | ............ H02M 3/1584 |
| | | | | 363/16 |
| 2019/0131789 | A1* | 5/2019 | Huang | ....................... H02J 3/34 |
| 2021/0184586 | A1* | 6/2021 | Jin | ........................... H02M 3/07 |

FOREIGN PATENT DOCUMENTS

JP          2016-59267          4/2016

* cited by examiner

*Primary Examiner* — Alex Torres-Rivera
(74) *Attorney, Agent, or Firm* — Chip Law Group

(57) ABSTRACT

The switching power supply device includes first and second switches connected in series between an application end of an input voltage and an application end of a low voltage lower than the input voltage, and third and fourth switches connected in series between an application end of the input voltage and an application end of the low voltage, and a control unit configured to control the on/off state of each of the first to fourth switches. The first to fourth switches are configured such that an inductor is provided between a first connection node connecting the first switch and the second switch and a second connection node connecting the third switch and the fourth switch.

14 Claims, 9 Drawing Sheets

SWITCHING POWER SUPPLY DEVICE

CROSS REFERENCE TO RELATED APPLICATIONS

This application claims priority benefit of Japanese Patent Application No. JP 2020-094287 filed in the Japan Patent Office on May 29, 2020. Each of the above-referenced applications is hereby incorporated herein by reference in its entirety.

BACKGROUND

The invention disclosed in the present specification relates to a switching power supply device that lowers down an input voltage to an output voltage.

In a step-down switching power supply device that lowers an input voltage to an output voltage, recovery loss and switching loss generally occur when the high-side switch is switched from the off state to the on state, and these two losses cause efficiency deterioration. As the switching frequency of the step-down switching power supply device is higher, the number of times the above two losses occur in a certain period of time increases, so that the efficiency deterioration becomes remarkable. Further, as the input voltage of the step-down switching power supply device gets larger, the switching loss becomes larger, so that the efficiency deterioration becomes remarkable.

SUMMARY

For example, according to the switching power supply device disclosed in JP 2016-59267 A, the above two losses can be suppressed. However, the switching power supply device disclosed in JP 2016-59267 A has a structural restriction that requires a transformer (coupled inductor).

The switching power supply device disclosed in the present specification is a switching power supply device configured to lower an input voltage to an output voltage and has a configuration (first configuration) so as to include a first switch having a first end connectable to an application end of the input voltage, and having a second end connectable to a first end of a first inductor, a second switch having a first end connectable to the first end of the first inductor and the second end of the first switch, and having a second end connectable to an application end of a low voltage lower than the input voltage, a third switch having a first end connectable to an application end of the input voltage, a fourth switch having a first end connectable to a second end of the third switch, and having a second end connectable to an application end of the low voltage, and a control unit configured to control an on/off state of each of the first to fourth switches, and the first to fourth switches are provided with a second inductor between a first connection node connecting the first switch and the second switch and a second connection node connecting the third switch and the fourth switch.

In the switching power supply device of the first configuration, a configuration (second configuration) may be employed such that a current does not flow from the first connection node to the second connection node via the second inductor during normal operation.

In the switching power supply device of the first or second configuration, a configuration (third configuration) may be employed such that the device switches the on/off state of each of the third switch and the fourth switch in the switching process of the on/off state of each of the first switch and the second switch.

In the switching power supply device of any one of first to third configurations, a configuration (fourth configuration) may be employed such that the control unit has state settings including a first state in which the first switch is in an on state and the second to fourth switches are in an off state, a second state in which the second switch is in the on state and the first, third, and fourth switches are in the off state, a third state in which the second and third switches are in the on state and the first and fourth switches are in the off state, a fourth state in which the third switch is in the on state and the first, second, and fourth switches are in the off state, and a fifth state in which the first and fourth switches are in the on state and the second and third switches are in the off state.

In the switching power supply device of the fourth configuration, a configuration (fifth configuration) may be employed such that the control unit repeats setting of the first to fifth states in an order of the first state, second state, third state, fourth state, and fifth state.

In the switching power supply device of the fourth or fifth configuration, a configuration (sixth configuration) may be employed such that the control unit performs a transition from the third state to the fourth state when a current flowing through the second switch becomes substantially zero in the third state.

In the switching power supply device of any one of the fourth to sixth configurations, a configuration (seventh configuration) may be employed such that the control unit performs a transition from the fourth state to the fifth state when a potential difference between the first end and the second end of the first switch becomes substantially zero in the fourth state.

In the switching power supply device of any one of the first to seventh configurations, a configuration (eighth configuration) may be employed such that the first to fourth switches are provided with a capacitance between the first connection node and the second connection node, and the capacitance is connected in series with the second inductor.

The switch control device disclosed in the present specification has a configuration (ninth configuration) so as to be a part of a switching power supply device including a first switch having a first end connectable to an application end of an input voltage, and having a second end connectable to a first end of a first inductor, a second switch having a first end connectable to the first end of the first inductor and the second end of the first switch, and having a second end connectable to an application end of a low voltage lower than the input voltage, a third switch having a first end connectable to an application end of the input voltage, a fourth switch having a first end connectable to a second end of the third switch, and having a second end connectable to an application end of the low voltage, a control unit configured to control the on/off state of each of the first to fourth switches, and the first to fourth switches being configured such that a second inductor is provided between a first connection node connecting the first switch and the second switch and a second connection node connecting the third switch and the fourth switch, and the switch control device controls the on/off state of the third switch and the on/off state of the fourth switch.

In the switch control device of the ninth configuration, a configuration (tenth configuration) may be employed such that the on/off state of each of the third switch and the fourth switch are switched in the switching process of the on/off state of each of the first switch and the second switch.

In the switch control device of the ninth or tenth configuration, a configuration (eleventh configuration) may be employed such that the on/off state of the first switch and the on/off state of the second switch are controlled.

The in-vehicle device disclosed in the present specification has a configuration (twelfth configuration) so as to have a switching power supply device of any one of the first to eighth configurations or a switch control device of any one of the ninth to eleventh configurations.

The vehicle disclosed in the present specification has a configuration (thirteenth configuration) so as to have an in-vehicle device of the twelfth configuration, and a battery that supplies electric power to the in-vehicle device.

According to the invention disclosed in the present specification, high efficiency can be achieved.

DETAILED DESCRIPTION OF THE PREFERRED EMBODIMENTS

In the present specification, a metal oxide semiconductor (MOS) transistor is a transistor whose gate structure has at least three layers of "a layer composed of a conductor or a semiconductor having a small resistance value such as polysilicon," an "insulating layer," and a "P-type, N-type, or intrinsic semiconductor layer." That is, the gate structure of the MOS transistor is not limited to the three-layer structure of a metal, oxide, and semiconductor.

First Embodiment

Figure 1:
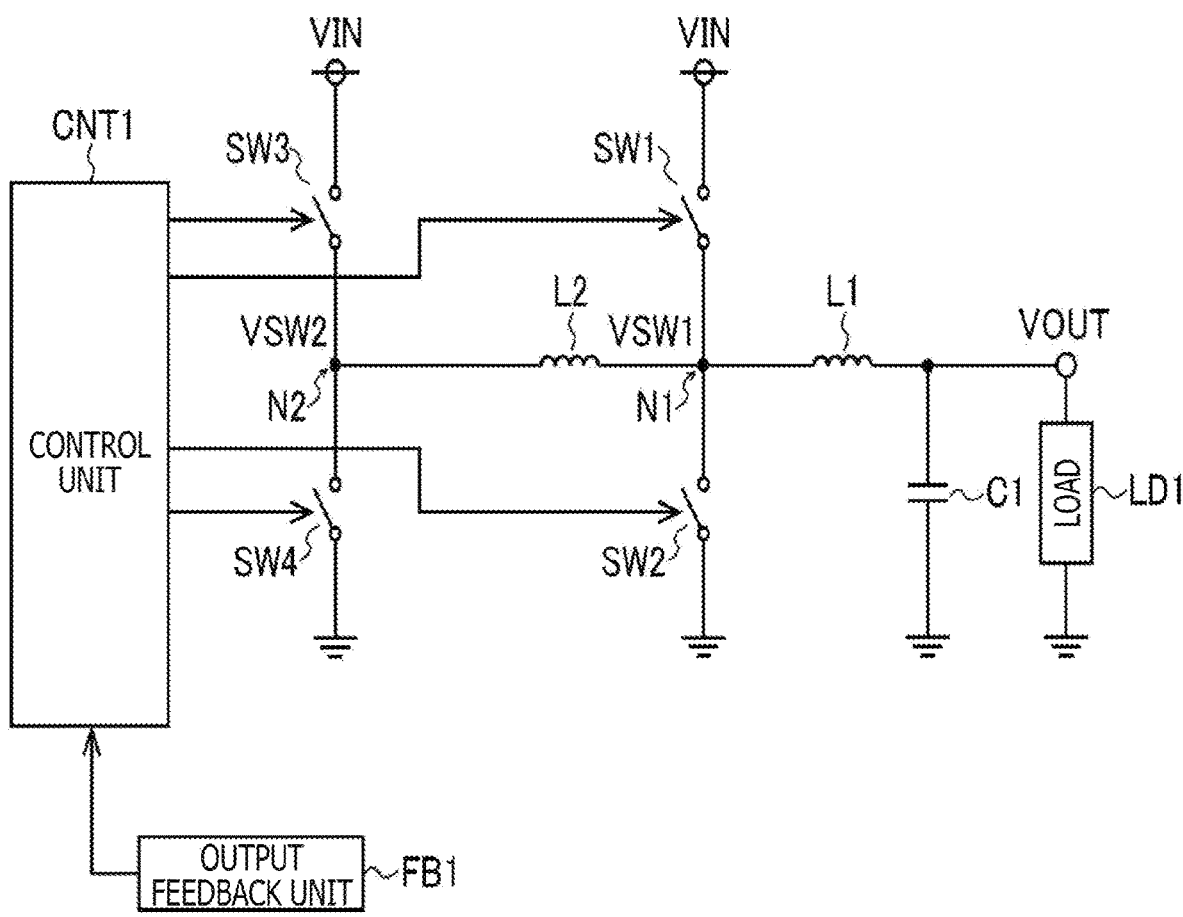
FIG. 1 is a diagram illustrating a configuration of a switching power supply device according to a first embodiment.

FIG. 1 is a diagram illustrating a configuration of a switching power supply device according to the first embodiment. A switching power supply device 1A according to the first embodiment (hereinafter, referred to as "switching power supply device 1A") is a switching power supply device that lowers an input voltage VIN to an output voltage VOUT, and includes a control unit CNT1, first to fourth switches SW1 to SW4, a first inductor L1, a second inductor L2, an output capacitor C1, and an output feedback unit FB1.

The control unit CNT1 controls the on/off state of the first to fourth switches SW1 to SW4 on the basis of the output of the output feedback unit FB1. In other words, the control unit CNT1 is a switch control device that controls the on/off state of the first to fourth switches SW1 to SW4. The control unit CNT1 is also a switch control device that controls the on/off state of a third switch SW3 and the fourth switch SW4.

The first switch SW1 is configured such that the first end thereof can be connected to an application end to which the input voltage VIN is applied and the second end can be connected to the first end of the first inductor L1. The first switch SW1 connects/disconnects the current path extending from the application end of the input voltage VIN to the first inductor L1. A P-channel type MOS transistor, an N-channel type MOS transistor, or other transistors can be used as the first switch SW1, for example. When an N-channel type MOS transistor is used for the first switch SW1, for example, it is sufficient if a bootstrap circuit or other circuit is provided in the switching power supply device 1A in order to generate a voltage larger than the input voltage VIN.

The first end of a second switch SW2 is configured to be connectable to the first end of the first inductor L1 and the second end of the first switch SW1, and the second end of the second switch SW2 is configured to be connectable to an application end to which the ground potential is applied. The second switch SW2 connects/disconnects a current path extending from the application end of the ground potential to the first inductor L1. An N-channel type MOS transistor can be used as the second switch SW2, for example.

By switching the first switch SW1 and the second switch SW2, a pulsed switch voltage VSW is generated at a first connection node N1 connecting the first switch SW1 and the second switch SW2. The first inductor L1 and the output capacitor C1 smooth the pulsed switch voltage VSW to generate the output voltage VOUT, and supply the output voltage VOUT to the application end of the output voltage VOUT. A load LD1 is connected to the application end of the output voltage VOUT, and the output voltage VOUT is supplied to the load LD1.

The output feedback unit FB1 generates and outputs a feedback signal corresponding to the output voltage VOUT. A resistance voltage dividing circuit or other circuit that generates a feedback signal by resistively dividing the output voltage VOUT can be used as the output feedback unit FB1, for example. Further, for example, the output feedback unit FB1 may be configured to acquire the output voltage VOUT and output the output voltage VOUT as it is as a feedback signal. The output feedback unit FB1 may be configured to also generate and output a feedback signal according to the current flowing through the first inductor L1 in addition to the feedback signal according to the output voltage VOUT. The output feedback unit FB1 also generates a feedback signal according to the current flowing through the first inductor L1, so that a current mode can be controlled.

The third switch SW3 is configured such that the first end thereof can be connected to an application end of the input voltage VIN. A P-channel type MOS transistor, an N-channel type MOS transistor, or other transistor can be used as the third switch SW3, for example. When an N-channel type MOS transistor is used for the third switch SW3, for example, it is sufficient if a bootstrap circuit or other circuit is provided in the switching power supply device 1A in order to generate a voltage larger than the input voltage VIN.

The fourth switch SW4 is configured such that the first end thereof can be connected to a second end of the third switch SW3 and the second end of the fourth switch SW4 can be connected to an application end of the ground potential. An N-channel type MOS transistor or other transistor can be used as the fourth switch SW4, for example.

The second inductor L2 is provided between the first connection node N1 connecting the first switch SW1 and the second switch SW2 and a second connection node N2 connecting the third switch SW3 and the fourth switch SW4. To be specific, the first end of the second inductor L2 is connected to the first connection node N1, and the second end of the second inductor L2 is connected to the second connection node N2.

An inductance value of the second inductor L2 is smaller than an inductance value of the first inductor L1. For example, the inductance value of the second inductor L2 is preferably set to approximately 1/10 of the inductance value of the first inductor L1.

Figure 2:
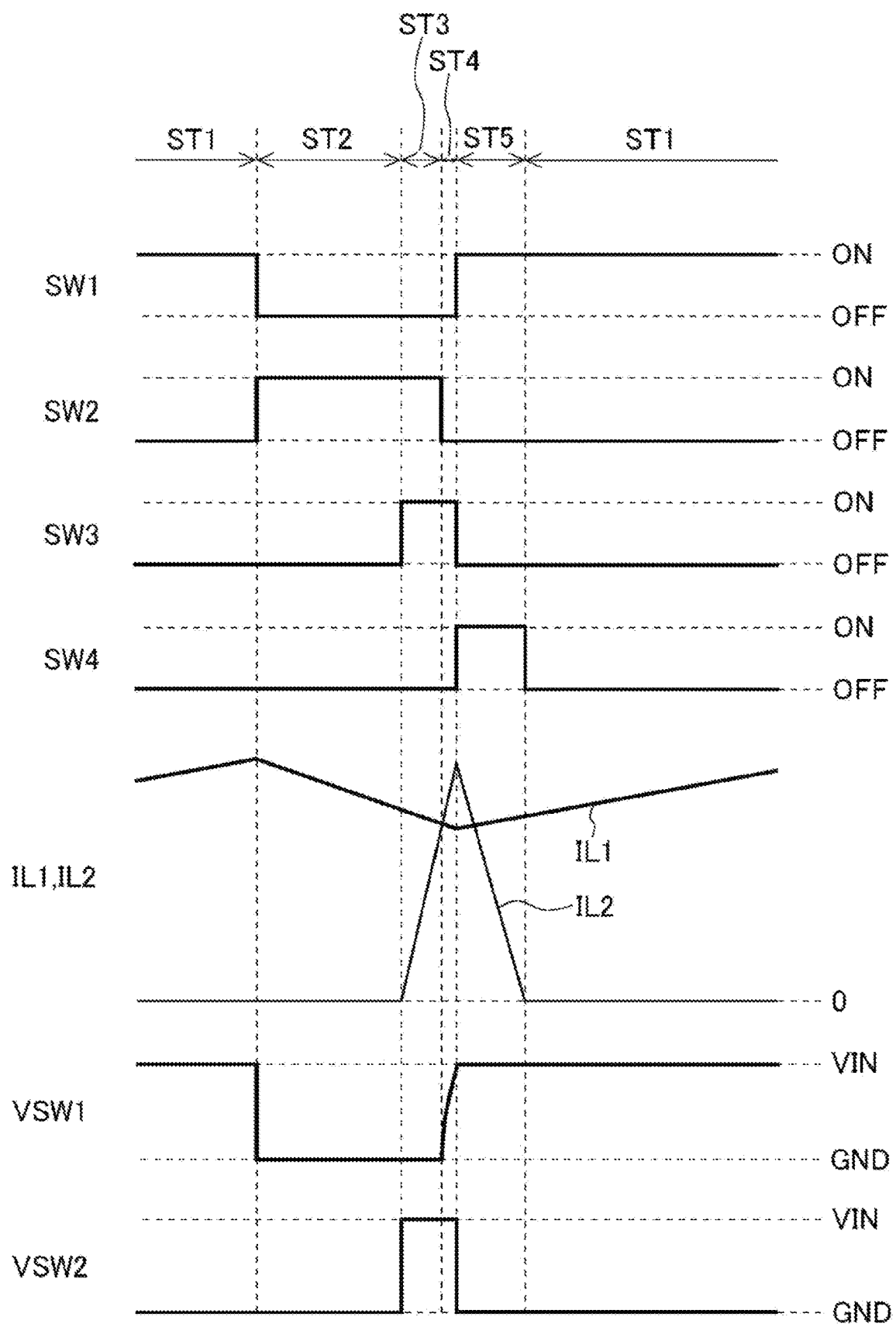
FIG. 2 is a time chart illustrating an operation of the switching power supply device according to the first embodiment.

FIG. 2 is a time chart illustrating an operation of the switching power supply device 1A. The control unit CNT1 sets a length of a first state ST1 according to the feedback signal output from the output feedback unit FB1. As the load LD1 gets lighter, the length of the first state ST1 becomes shorter.

Figure 3:
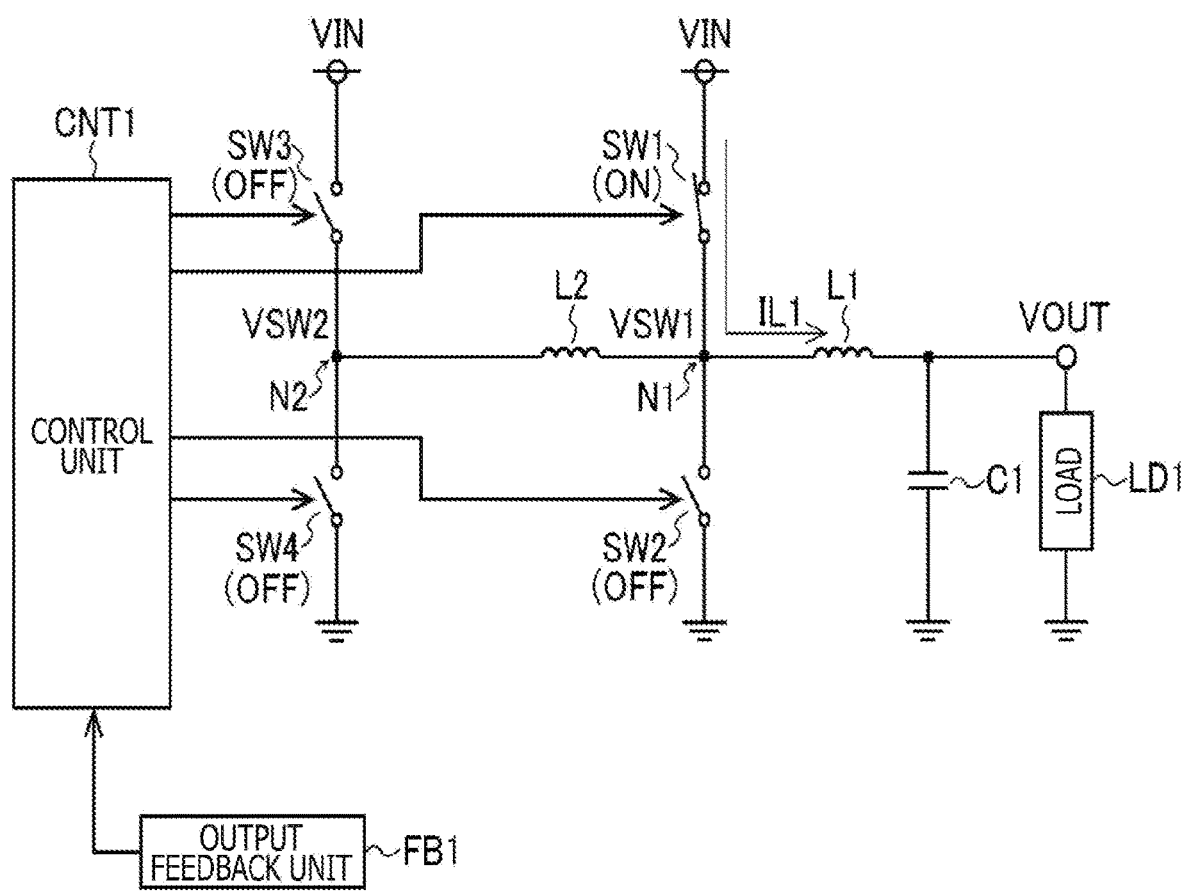
FIG. 3 is a diagram illustrating a first state of the switching power supply device according to the first embodiment.

In the first state ST1, the control unit CNT1 holds the on state of the first switch SW1 and the off state of the second to fourth switches SW2 to SW4. As a result, a first inductor current IL1 flows from the first switch SW1 toward the first inductor (see FIG. 3).

In the first state ST1, a first switch voltage VSW1 has substantially the same value as the input voltage VIN, and a second switch voltage VSW2 has substantially the same value as a ground potential GND. Further, in the first state ST1, the first inductor current IL1 increases with the passage of time, and a second inductor current IL2 is zero.

When the first state ST1 ends, the control unit CNT1 switches the control state from the first state ST1 to a second state ST2.

Figure 4:
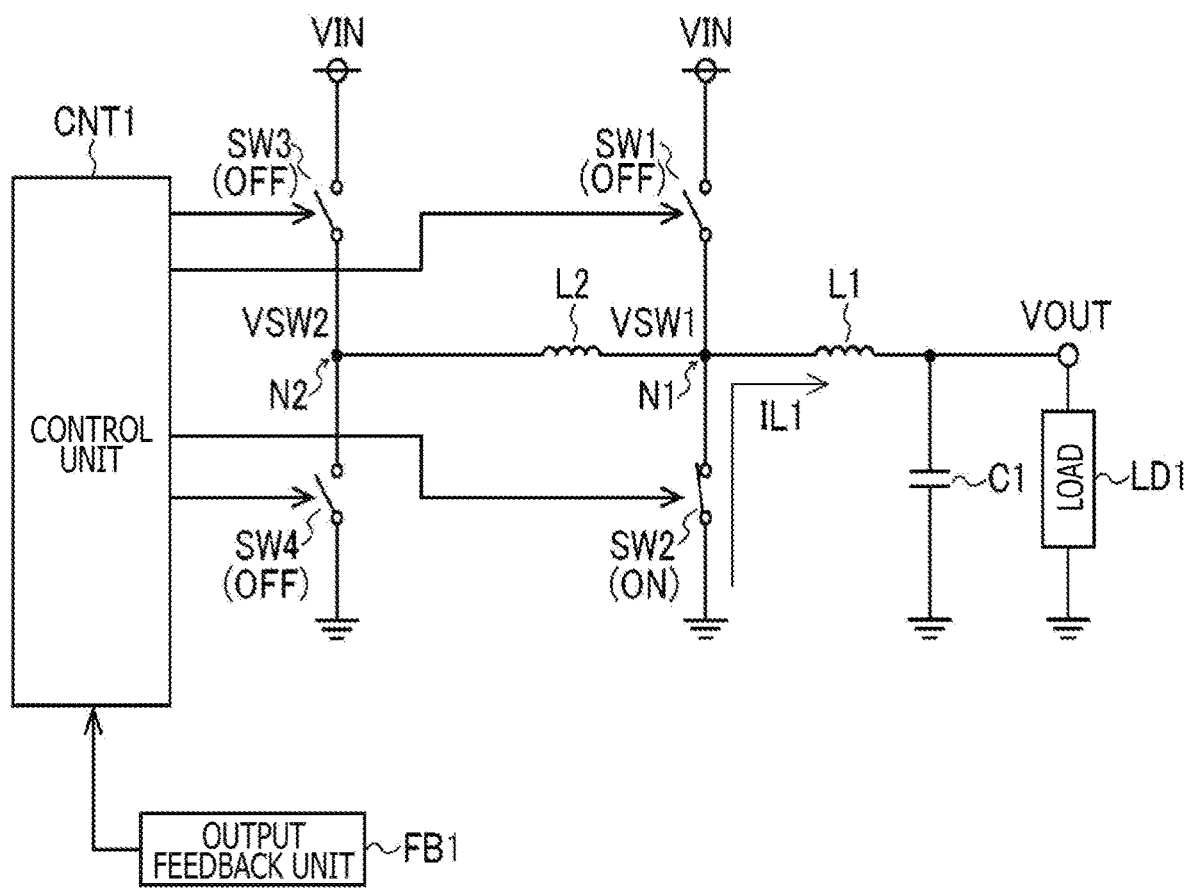
FIG. 4 is a diagram illustrating a second state of the switching power supply device according to the first embodiment.

In the second state ST2, the control unit CNT1 holds the on state of the second switch SW2 and the off state of the first, third, and fourth switches SW1, SW3, and SW4. As a result, the first inductor current IL1 flows from the second switch SW2 toward the first inductor (see FIG. 4).

In the second state ST2, both the first switch voltage VSW1 and the second switch voltage VSW2 have substantially the same values as the ground potential GND. Further, in the second state ST2, the first inductor current IL1 decreases with the passage of time, and the second inductor current IL2 is zero.

When the second state ST2 ends, the control unit CNT1 switches the control state from the second state ST2 to a third state ST3.

Figure 5:
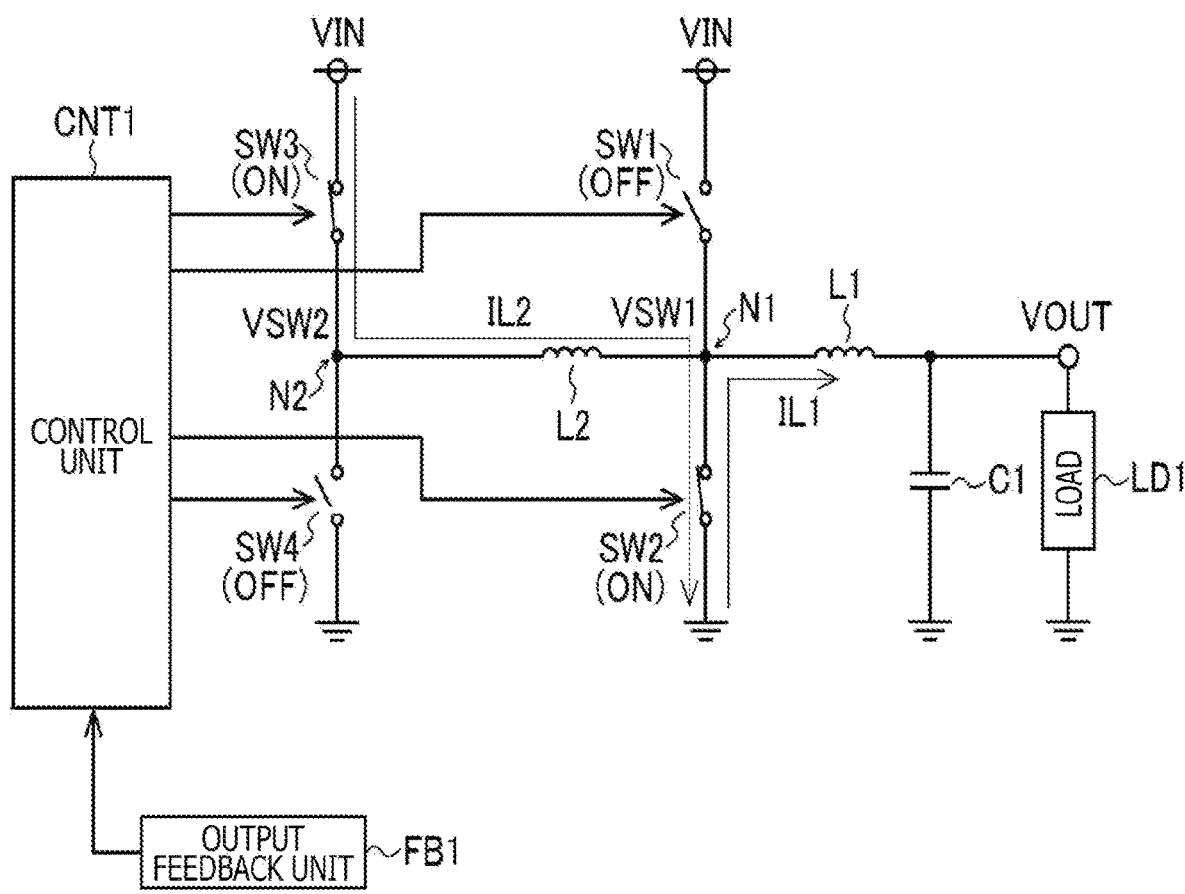
FIG. 5 is a diagram illustrating a third state of the switching power supply device according to the first embodiment.

In the third state ST3, the control unit CNT1 holds the on state of the second and third switches SW2 and SW3, and the off state of the first and fourth switches SW1 and SW4. As a result, the first inductor current IL1 flows from the second switch SW2 toward the first inductor, and the second inductor current IL2 flows from the third switch SW3 toward the second switch SW2 via the second inductor L2 at the same time (see FIG. 5). Therefore, the current flowing through the second switch SW2 is the total current of the first inductor current IL1 and the second inductor current IL2.

In the third state ST3, the first switch voltage VSW1 has substantially the same value as the ground potential GND, and the second switch voltage VSW2 has substantially the same value as the input voltage VIN. Further, in the third state ST3, the first inductor current IL1 decreases with the passage of time, and the second inductor current IL2 increases with the passage of time.

When the absolute value of the first inductor current IL1 and the absolute value of the second inductor current IL2 become substantially equal, that is, when the current flowing through the second switch SW2 becomes substantially zero, the control unit CNT1 changes the control state from the third state ST3 to a fourth state ST4. Therefore, it is sufficient if the switching power supply device 1A includes a first detector that detects zero crossing of the current flowing through the second switch SW2, for example, and the control unit CNT1 changes from the third state ST3 to the fourth state ST4 on the basis of the output of the first detector.

Figure 6:
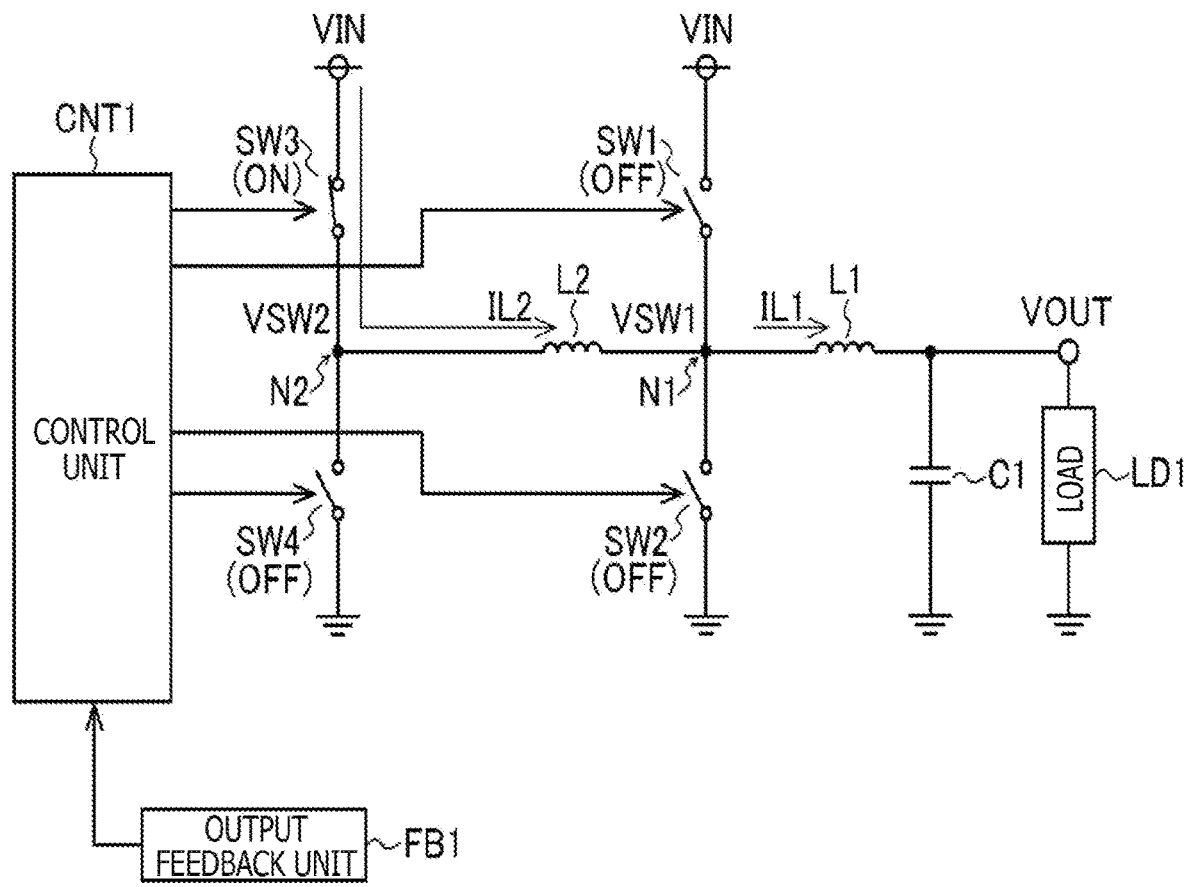
FIG. 6 is a diagram illustrating a fourth state of the switching power supply device according to the first embodiment.

In the fourth state ST4, the control unit CNT1 holds the on state of the third switch SW3 and the off state of the first, second, and fourth switches SW1, SW2, and SW4. As a result, the first inductor current IL1 flows through the first inductor, and the second inductor current IL2 flows from the third switch SW3 toward the second inductor L2 (see FIG. 6).

In the fourth state ST4, the second switch voltage VSW2 has substantially the same value as the input voltage VIN. Further, in the fourth state ST4, the first inductor current IL1 decreases as time passes, and the second inductor current IL2 increases as time passes. In such a current state, since both the first and second switches SW1 and SW2 are in the off state, the first switch voltage VSW1 increases as time passes.

When the first switch voltage VSW1 and the input voltage VIN become substantially equal, that is, when a potential difference between the first end and the second end of the first switch SW1 becomes substantially zero, the control unit CNT1 changes the control state from the fourth state ST4 to a fifth state ST5. Therefore, it is sufficient if the switching power supply device 1A includes a second detector that detects whether or not the potential difference between the first end and the second end of the first switch SW1 is substantially zero, for example, and the control unit CNT1 executes the switching from the fourth state ST4 to the fifth state ST5 on the basis of the output of the second detector.

Figure 7:
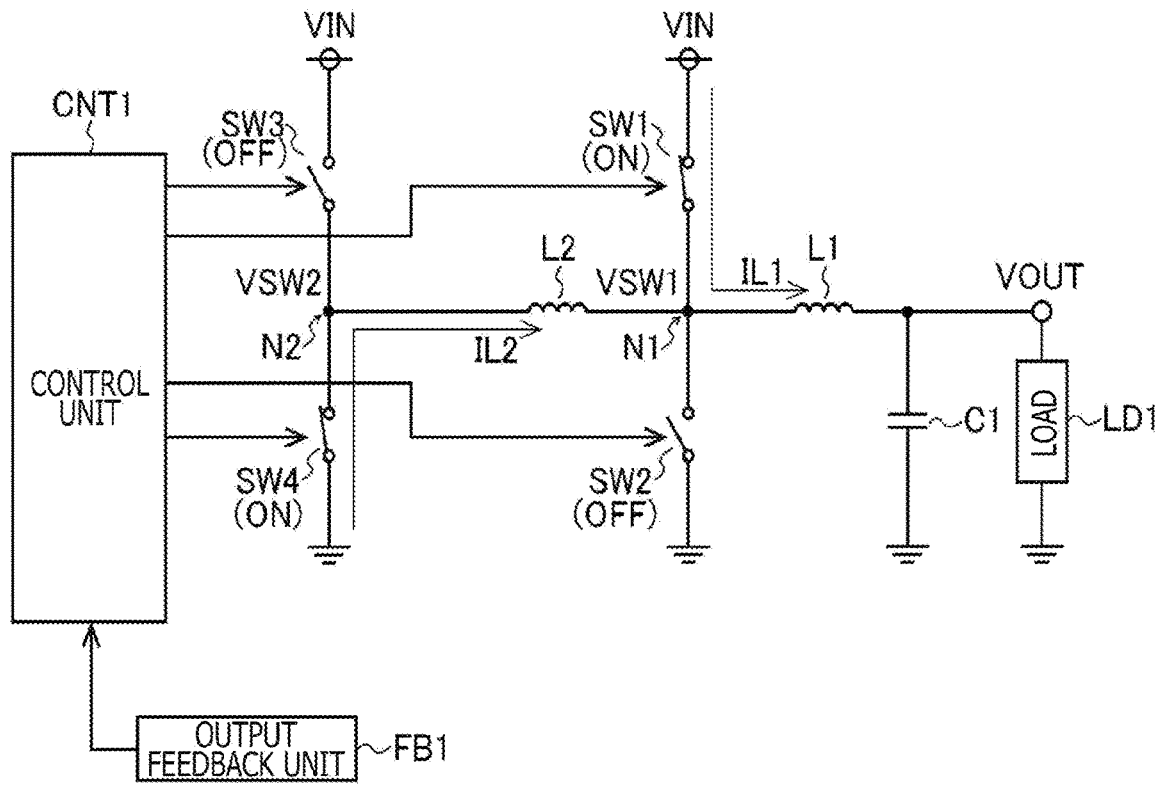
FIG. 7 is a diagram illustrating a fifth state of the switching power supply device according to the first embodiment.

In the fifth state ST5, the control unit CNT1 holds the on state of the first and fourth switches SW1 and SW4, and the off state of the second and third switches SW2 and SW3. As a result, the first inductor current IL1 flows from the first switch SW1 toward the first inductor, and the second inductor current IL2 flows from the fourth switch SW4 toward the second inductor L2 at the same time (see FIG. 7).

In the fifth state ST5, the first switch voltage VSW1 has substantially the same value as the input voltage VIN, and the second switch voltage VSW2 has substantially the same value as the ground potential GND. Further, in the fifth state ST5, the first inductor current IL1 increases as time passes, and the second inductor current IL2 decreases as time passes.

When the second inductor current IL2 becomes substantially zero, that is, when the current flowing through the fourth switch SW4 becomes substantially zero, the control unit CNT1 switches the control state from the fifth state ST5 to the first state ST1. Therefore, for example, it is sufficient if the switching power supply device 1A includes a third detector that detects zero crossing of the current flowing through the fourth switch SW4, and the control unit CNT1 performs change from the fifth state ST5 to the first state ST1 on the basis of the output of the third detector.

According to the operation of the switching power supply device 1A described above, the control unit CNT1 turns the on/off state of each of the third switch SW3 and the fourth switch SW4 in the switching process of the on/off state of each of the first switch SW1 and the second switch SW2. To be specific, in the process from the third state ST3 to the fifth state ST5, that is, in the process in which the first switch SW1 switches from the off state to the on state and the second switch SW2 switches from the on state to the off state, the control unit CNT1 switches the third switch SW3 from the on state to the off state and switches the fourth switch SW4 from the off state to the on state.

According to the operation of the switching power supply device 1A described above, as is clear from FIGS. 3 to 7, a current does not flow from the first connection node N1 to the second connection node N2 via the second inductor L2 during normal operation. The above-mentioned normal operation does not include the transitional period that occurs when the control unit CNT1 performs switching among the states from the first state ST1 to the fifth state ST5. The transitional period is sufficiently short compared with each period of the first state ST1 to the fifth state ST5. As an example of the transitional period, a period generated between the first state ST1 and the second state ST2 when switching from the first state ST1 to the second state ST2 is carried out can be mentioned.

Since the switching power supply device 1A switches the first switch SW1 from the off state to the on state after the potential difference between the first end and the second end of the first switch SW1 becomes substantially zero, the recovery loss and switching loss in the first switch SW1 can be suppressed, and high efficiency can be achieved.

As a modification of the present embodiment, each of the second switch SW2 and the fourth switch SW4 may have the second end connectable to an application end having a low voltage lower than the input voltage VIN and other than the ground potential.

Second Embodiment

Figure 8:
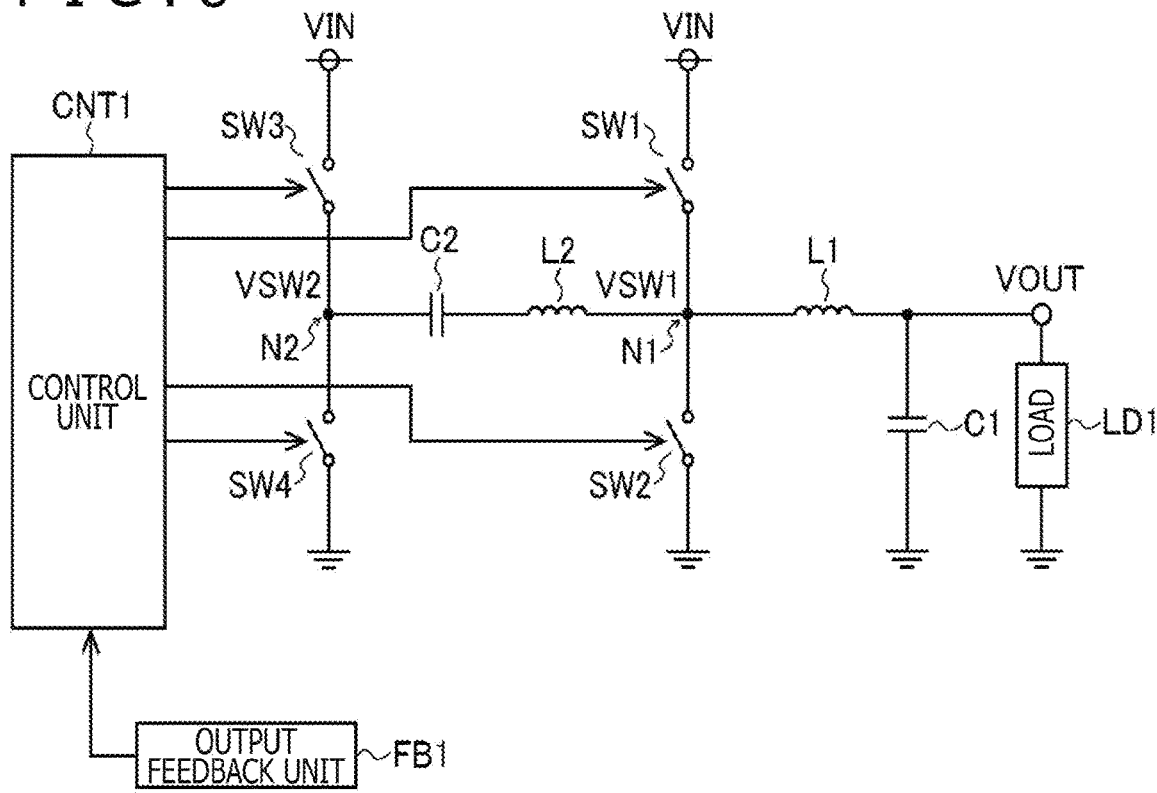
FIG. 8 is a diagram illustrating a configuration of a switching power supply device according to a second embodiment.
Figure 9:
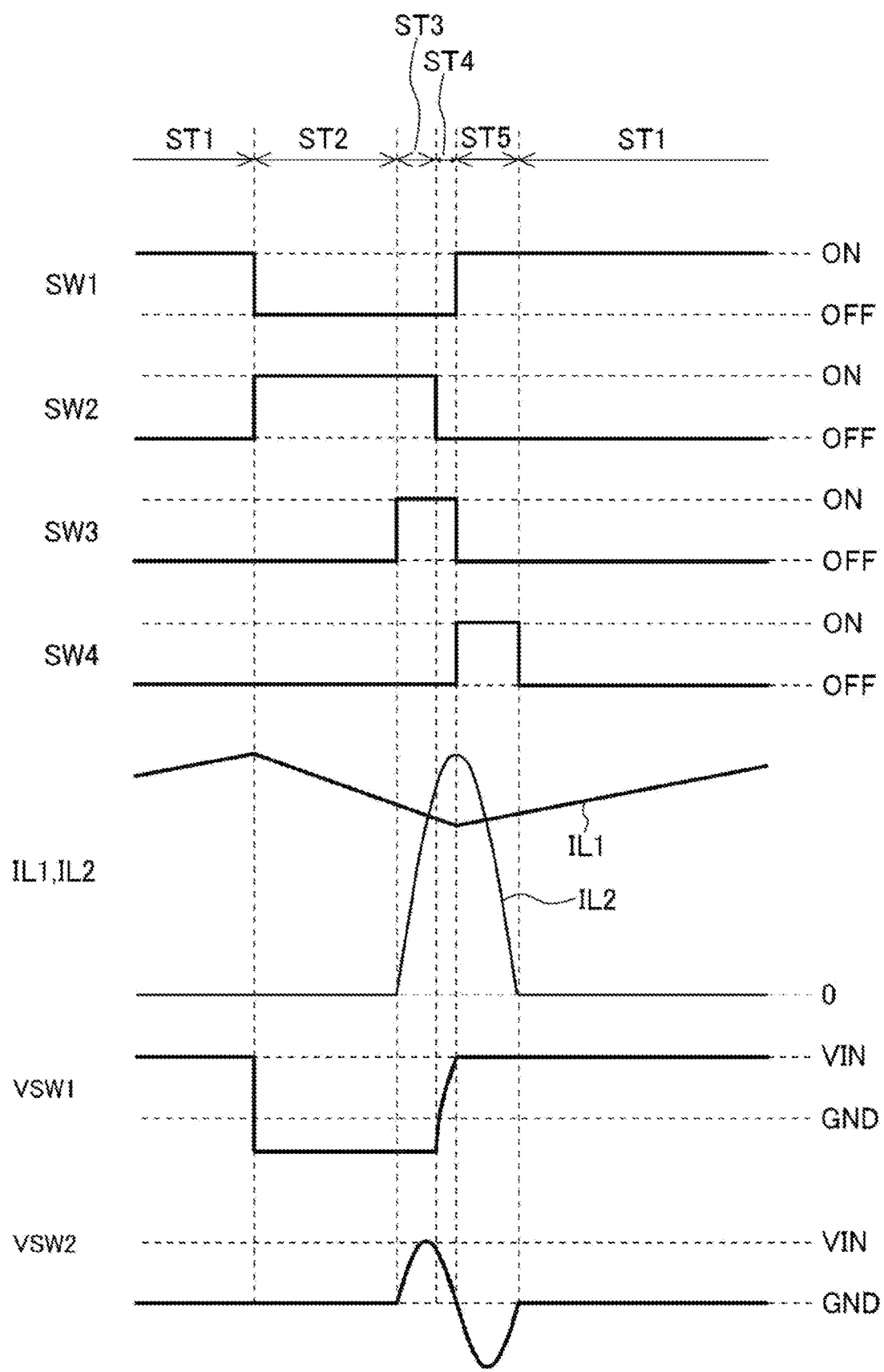
FIG. 9 is a time chart illustrating an operation of the switching power supply device according to the second embodiment.

In the second embodiment, description of a similar configuration and operation to those in the first embodiment will be omitted. FIG. 8 is a diagram illustrating a configuration of a switching power supply device according to the second embodiment. A switching power supply device 1B according to the second embodiment (hereinafter, referred to as "switching power supply device 1B") has a configuration in which a capacitance C2 is added to the switching power supply device 1A. FIG. 9 is a time chart illustrating an operation of the switching power supply device 1B.

The capacitance C2 is provided between the first connection node N1 connecting the first switch SW1 and the second switch SW2 and the second connection node N2 connecting the third switch SW3 and the fourth switch SW4. Then, the capacitance C2 is connected in series with the second inductor L2. To be specific, the first end of the second inductor L2 is connected to the first connection node N1, and the first end of the capacitance C2 is connected to the second end of the second inductor L2, and further, the second end of the capacitance C2 is connected to the second connection node N2.

Unlike the present embodiment, the first end of the capacitance C2 may be connected to the first connection node N1, and the first end of the second inductor L2 may be connected to the second end of the capacitance C2, and further, the second end of the second inductor L2 may be connected to the second connection node N2.

Since the switching power supply device 1B can cause a full-wave current to flow through the second connection node N2 due to resonance between the second inductor L2 and the capacitance C2, the peak of the second inductor current IL2 can be suppressed (see FIG. 9). Therefore, the switching power supply device 1B can suppress generation of noise as compared with the switching power supply device 1A.

Further, as a modification of the present embodiment, each of the second switch SW2 and the fourth switch SW4 may have the second end connectable to a low voltage application end having a voltage lower than the input voltage VIN and other than the ground potential.

<Configuration of Control Unit>

Figure 10:
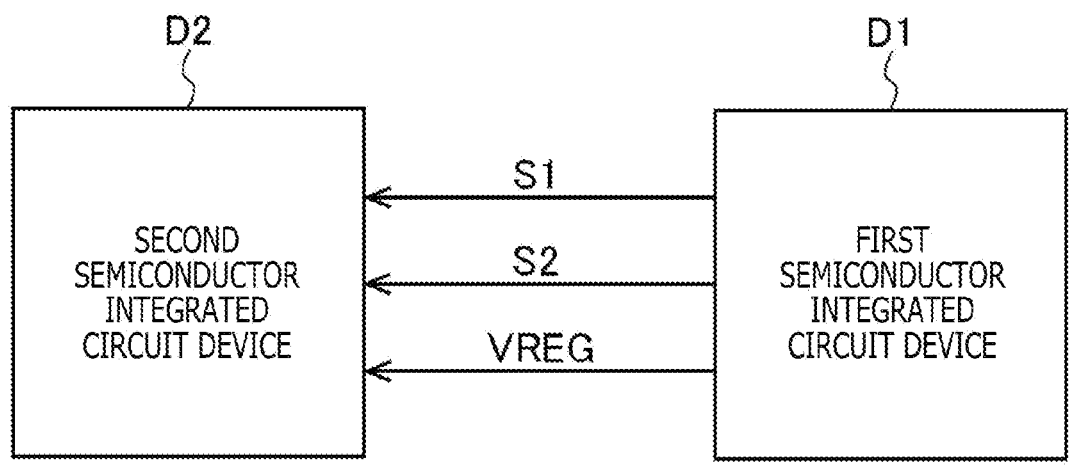
FIG. 10 is a diagram illustrating a configuration example of a control unit.

FIG. 10 is a diagram illustrating a configuration example of the control unit CNT1. In the configuration example illustrated in FIG. 10, the control unit CNT1 is separately mounted on a first semiconductor integrated circuit device D1 and a second semiconductor integrated circuit device D2.

The first semiconductor integrated circuit device D1 is equipped with a portion of the control unit CNT1 that controls the on/off state of each of the first switch SW1 and the second switch SW2. The first switch SW1 and the second switch SW2 may be built in the first semiconductor integrated circuit device D1 or may be externally connected to the first semiconductor integrated circuit device D1.

On the other hand, the second semiconductor integrated circuit device D2 is equipped with a portion of the control unit CNT1 that controls the on/off state of each of the third switch SW3 and the fourth switch SW4. The third switch SW3 and the fourth switch SW4 may be built in the second semiconductor integrated circuit device D2, or may be externally connected to the second semiconductor integrated circuit device D2.

The first semiconductor integrated circuit device D1 supplies a first signal S1, a second signal S2, and an internally generated voltage VREG to the second semiconductor integrated circuit device D2.

The first signal S1 is a signal for notification regarding the period during which the second connection node N2 has high impedance, that is, the period from the beginning of the first state ST1 to the end of the second state ST2.

The second signal S2 is a signal for notification regarding the switching timing from the fourth state ST4 to the fifth state ST5. For example, the output of the second detector described above may be used as the second signal S2.

The internally generated voltage VREG is a constant voltage generated inside the first semiconductor integrated circuit device D1 on the basis of the input voltage VIN.

By mounting the control unit CNT1 separately on the first semiconductor integrated circuit device D1 and the second semiconductor integrated circuit device D2, the devices can be selectively used such that both the first semiconductor integrated circuit device D1 and the second semiconductor integrated circuit device D2 are used when high efficiency is required, and only the first semiconductor integrated circuit device D1 is used when cost reduction is prioritized over efficiency improvement.

<Use Application>

Figure 11:
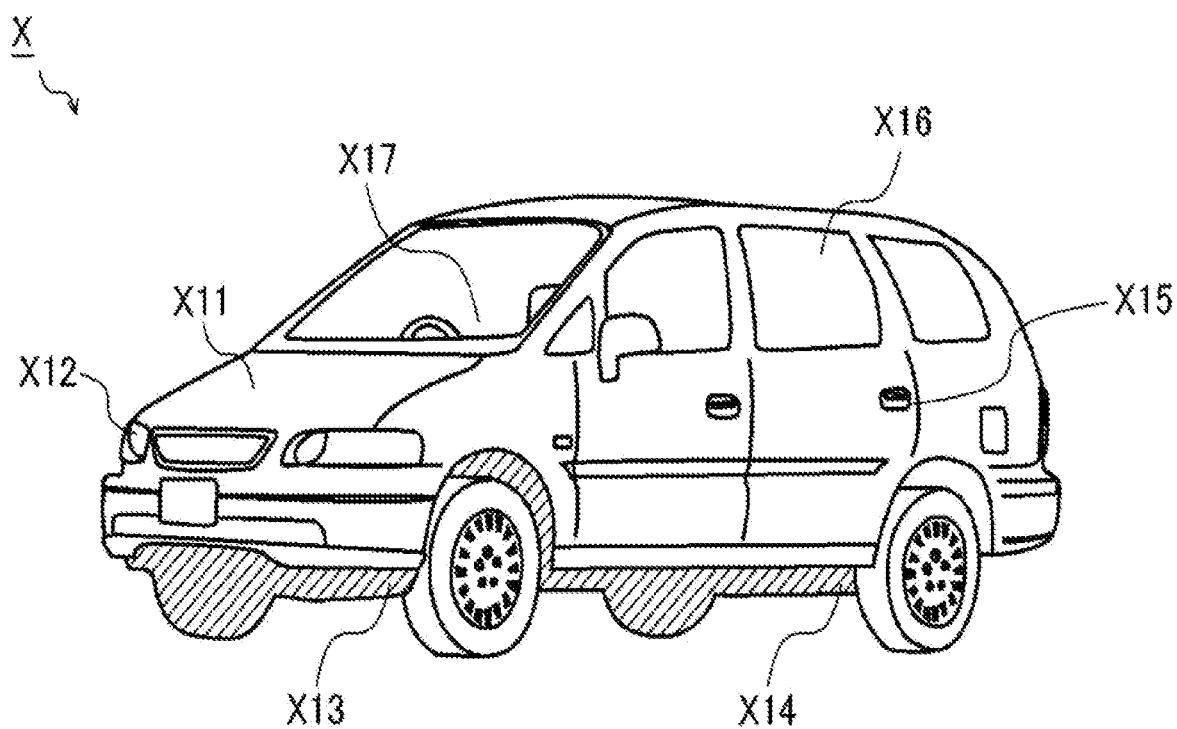
FIG. 11 is an external view illustrating a configuration example of a vehicle.

Next, use application examples of the switching power supply device 1 described above will be described. FIG. 11 is an external view illustrating a configuration example of a vehicle equipped with in-vehicle devices. A vehicle X of this configuration example is equipped with in-vehicle devices X11 to X17 and a battery (not illustrated) for supplying electric power to these in-vehicle devices X11 to X17.

When the switching power supply device 1A or 1B described above is mounted on the vehicle X, it is required to suppress a radiation noise in an amplitude modulation (AM) band so as not to adversely affect the reception of the AM radio broadcast. Therefore, it is desirable for the switching control circuit 1 to generate a voltage of 1.8 MHz or more and 2.1 MHz or less at the first connection node N1. That is, it is desirable for the switching control circuit 1 to set the frequency (switching frequency) of the switch voltage VSW to 1.8 MHz or more and 2.1 MHz or less. This is because, if the switching frequency is less than 1.8 MHz, the radiation noise in the AM band increases, and if the switching frequency is larger than 2.1 MHz, the switching loss exceeds a permissible range.

The in-vehicle device X11 is an engine control unit that performs control related to the engine (injection control, electronic throttle control, idling control, oxygen sensor heater control, auto cruise control, or other control).

The in-vehicle device X12 is a lamp control unit that performs control for turning the light on and off such as high intensity discharged lamp (HID) and daytime running lamp (DRL).

The in-vehicle device X13 is a transmission control unit that performs control related to the transmission.

The in-vehicle device X14 is a body control unit that performs controls related to the movement of the vehicle X (anti-lock brake system (ABS) control, electric power steering (EPS) control, electronic suspension control, or other control).

The in-vehicle device X15 is a security control unit that controls drive of a door lock, a security alarm, or other security components.

The in-vehicle device X16 is an electronic device incorporated in the vehicle X at the factory shipment stage as standard equipment or manufacturer's options such as a wiper, an electric door mirror, a power window, a power sunroof, an electric seat, and an air conditioner.

The in-vehicle device X17 is an electronic device that is optionally mounted on the vehicle X by the user, such as an in-vehicle audio/visual (A/V) device, a car navigation system, and an electronic toll collection system (ETC).

The switching power supply device 1A or 1B described above can be incorporated into any of the in-vehicle devices X11 to X17.

<Points to Note>

In addition to the above-described embodiment, the configuration of the present invention can be modified in various ways without departing from the gist of the invention. It should be considered that the embodiments are exemplary in all respects and are not restrictive, and it should be understood that the technical scope of the present invention is indicated by the claims rather than the description of the embodiments and all changes that fall within the scope of the claims and the meaning and scope of equality of the claims are included.

The embodiments disclosed here are illustrative in all aspects and should not be construed as restrictive. The scope of the present disclosure is indicated by the claims rather than the description of the embodiments, and all changes within the meaning and range of equivalents of the claims are intended to be included in the scope of the present disclosure.

What is claimed is:

1. A switching power supply device that is configured to lower an input voltage to an output voltage, the switching power supply device comprising:
   a first switch having a first end connectable to a first application end of the input voltage, and having a second end connectable to a first end of a first inductor;
   a second switch having a first end connectable to the first end of the first inductor and the second end of the first switch, and having a second end connectable to a first application end of a low voltage lower than the input voltage;
   a third switch having a first end connectable to a second application end of the input voltage;
   a fourth switch having a first end connectable to a second end of the third switch, and having a second end connectable to a second application end of the low voltage; and
   a control unit configured to control an on/off state of each of the first switch, the second switch, and the fourth switch, wherein
   the first switch, the second switch, the third switch, and the fourth switch are configured such that a second inductor between a first connection node and a second connection node,
   the first connection node connects the first switch and the second switch,
   the second connection node connects the third switch and the fourth switch,
   the control unit has state settings, and
   the state settings include:
      a first state in which the first switch is in an on state and each of the second switch, the third switch and the fourth switch is in an off state,
      a second state in which the second switch is in the on state and each of the first switch, the third switch, and the fourth switch is in the off state,
      a third state in which the second switch and the third switch are in the on state and each of the first switch and the fourth switch is in the off state,
      a fourth state in which the third switch is in the on state and each of the first switch, the second switch, and the fourth switch is in the off state, and
      a fifth state in which the first switch and the fourth switch are in the on state and each of the second switch and the third switch is in the off state.

2. The switching power supply device according to claim 1, wherein
   a current does not flow from the first connection node to the second connection node via the second inductor during normal operation.

3. The switching power supply device according to claim 1, wherein
   the switching power supply device is configured to switch the on/off state of each of the third switch and the fourth switch in a switching process of the on/off state of each of the first switch and the second switch.

4. The switching power supply device according to claim 1, wherein
   the control unit is further configured to repeat setting of the first state to the fifth state in an order of the first state, the second state, the third state, the fourth state, and the fifth state.

5. The switching power supply device according to claim 1, wherein
the control unit is further configured to perform a transition from the third state to the fourth state when a current flowing through the second switch becomes substantially zero in the third state.

6. The switching power supply device according to claim 1, wherein
the control unit is further configured to perform a transition from the fourth state to the fifth state when a potential difference between the first end and the second end of the first switch becomes substantially zero in the fourth state.

7. The switching power supply device according to claim 1, wherein
the first switch, the second switch, the third switch and the fourth switch are configured such that a capacitance is provided between the first connection node and the second connection node, and
the capacitance is connected in series with the second inductor.

8. An in-vehicle device, comprising:
the switching power supply device according claim 1.

9. A vehicle, comprising:
the in-vehicle device according to claim 8; and
a battery configured to supply electric power to the in-vehicle device.

10. A switch control device which is a part of a switching power supply device, comprising:
a first switch having a first end connectable to a first application end of an input voltage, and having a second end connectable to a first end of a first inductor;
a second switch having a first end connectable to the first end of the first inductor and the second end of the first switch, and having a second end connectable to a first application end of a low voltage lower than the input voltage;
a third switch having a first end connectable to a second application end of the input voltage;
a fourth switch having a first end connectable to a second end of the third switch, and having a second end connectable to a second application end of the low voltage; and
a control unit configured to control an on/off state of each of the first switch, the second switch, the third switch, and the fourth switch, wherein
the first switch, the second switch, the third switch, and the fourth switch are configured such that a second inductor is provided between a first connection node and a second connection node,
the first connection node connects the first switch and the second switch,
the second connection node connects the third switch and the fourth switch,
the switch control device is configured to control the on/off state of the third switch and the on/off state of the fourth switch,
after switching from a first state in which the first switch is in an on state and each of the second switch, the third switch, and the fourth switch is in an off state, to a second state in which the second switch is in the on state and the first switch is in the off state:
the third switch is switched to the on state as a third state, and after switching to a fourth state in which the second switch is in the off state:
the third switch is switched to the off state and each of the first switch and the fourth switch is switched to the on state, as a fifth state.

11. The switch control device according to claim 10, wherein
the switch control device is further configured to switch the on/off state of each of the third switch and the fourth switch in a switching process of the on/off state of each of the first switch and the second switch.

12. The switch control device according to claim 10, wherein
the switch control device is further configured to control the on/off state of the first switch and the on/off state of the second switch.

13. An in-vehicle device, comprising:
the switch control device according to claim 10.

14. A vehicle, comprising:
the in-vehicle device according to claim 13; and
a battery configured to supply electric power to the in-vehicle device.

* * * * *